US010625359B2

United States Patent
Nadler et al.

(10) Patent No.: US 10,625,359 B2
(45) Date of Patent: Apr. 21, 2020

(54) AUTOMATIC IDENTIFICATION OF COMPONENTS FOR WELDING AND CUTTING TORCHES

(71) Applicant: The ESAB Group Inc., Florence, SC (US)

(72) Inventors: Michael Nadler, Wilmot, NH (US); Maximilian Dougherty, Royalton, VT (US); Frederic Ewing, Huntington, NY (US)

(73) Assignee: THE ESAB GROUP INC., Florence, SC (US)

( * ) Notice: Subject to any disclaimer, the term of this patent is extended or adjusted under 35 U.S.C. 154(b) by 245 days.

(21) Appl. No.: 15/947,258

(22) Filed: Apr. 6, 2018

(65) Prior Publication Data

US 2019/0308268 A1    Oct. 10, 2019

(51) Int. Cl.
*B23K 10/00* (2006.01)
*B23K 9/10* (2006.01)
(Continued)

(52) U.S. Cl.
CPC .......... *B23K 9/1012* (2013.01); *B23K 9/095* (2013.01); *B23K 9/0953* (2013.01);
(Continued)

(58) Field of Classification Search
CPC .... B23K 9/1012; B23K 9/095; B23K 9/0953; B23K 9/0956; B23K 9/1006; B23K 10/00;
(Continued)

(56) References Cited

U.S. PATENT DOCUMENTS 5,357,076 A    10/1994   Blankenship
5,692,700 A    12/1997   Bobeczko
(Continued)

FOREIGN PATENT DOCUMENTS

EP    1117279 A1    7/2001
EP    2835041 B2    2/2015
(Continued)

OTHER PUBLICATIONS

Dzieza, Josh, "Inside Keurig's plan to stop you from buying knockoff K-Cups," The Verge, Jun. 30, 2014, accessible at https://www.theverge.com/2014/6/30/5857030/keurig-digital-rights-management-coffee-pod-pirates, 5 pages.
(Continued)

*Primary Examiner* — Mark H Paschall
(74) *Attorney, Agent, or Firm* — Edell, Shapiro & Finnan, LLC

(57) ABSTRACT

Automatically identifying interchangeable torch components, such as consumables, for welding and cutting torches includes adding one or more passive markings to a surface of an interchangeable torch component. Then, automatic identification can be effectuated by a torch assembly including a torch body and one or more imaging devices or a system including the torch assembly and a power supply. The torch body has an operative end configured to removably receive one or more interchangeable torch components including one or more passive markings. The one or more imaging devices are positioned to optically acquire an image of or image data representative of the one or more passive markings included on the one or more interchangeable torch components so that the one or more interchangeable torch components can be automatically identified based on the one or more passive markings. Consequently, various components can be reliably and consistently identified.

25 Claims, 8 Drawing Sheets

(51) Int. Cl.
*B23K 9/095* (2006.01)
*B23K 26/03* (2006.01)
*B23K 9/26* (2006.01)
*B23K 9/013* (2006.01)

(52) U.S. Cl.
CPC .......... *B23K 9/0956* (2013.01); *B23K 9/1006* (2013.01); *B23K 9/26* (2013.01); *B23K 10/00* (2013.01); *B23K 26/032* (2013.01); *B23K 9/013* (2013.01); *B23K 10/006* (2013.01)

(58) Field of Classification Search
CPC ...... B23K 9/26; B23K 10/006; B23K 26/032; B23K 9/013; H05H 1/02; H05H 1/36
USPC ....... 219/121.54, 121.39, 121.45, 121.48, 75
See application file for complete search history.

(56) References Cited

U.S. PATENT DOCUMENTS

| | | | |
|---|---|---|---|
| 5,989,485 | A | 11/1999 | Staacks |
| 6,091,048 | A | 7/2000 | Lanouette |
| 6,093,905 | A | 7/2000 | Hardwick |
| 6,163,009 | A | 12/2000 | Hardwick |
| 6,236,013 | B1 | 5/2001 | Delzenne |
| 6,326,583 | B1 | 12/2001 | Hardwick |
| 6,359,251 | B1 | 3/2002 | Picard |
| 6,477,623 | B2 | 11/2002 | Jeddeloh |
| 6,498,317 | B2 | 12/2002 | Hardwick |
| 6,552,303 | B1 | 4/2003 | Blankenship |
| 6,563,087 | B1 * | 5/2003 | Yokoyama ............... B23K 3/03 219/240 |
| 6,622,058 | B1 | 9/2003 | Picard |
| 6,677,551 | B2 | 1/2004 | Hardwick |
| 6,707,304 | B2 | 3/2004 | Bühler |
| 6,710,299 | B2 | 3/2004 | Blankenship |
| 6,772,040 | B1 | 8/2004 | Picard |
| 6,858,817 | B2 | 2/2005 | Blankenship |
| 6,900,408 | B2 | 5/2005 | Picard |
| 6,903,300 | B2 | 6/2005 | Fat |
| 6,947,802 | B2 | 9/2005 | Picard |
| 6,992,262 | B2 | 1/2006 | Mat |
| 7,032,814 | B2 | 4/2006 | Blankenship |
| 7,034,244 | B2 | 4/2006 | Mat |
| 7,186,944 | B2 | 3/2007 | Mat |
| 7,358,458 | B2 | 4/2008 | Daniel |
| 7,781,699 | B2 | 8/2010 | Schneider |
| 7,807,937 | B2 | 10/2010 | Schneider |
| 7,989,727 | B2 | 8/2011 | Twarog |
| 8,089,025 | B2 | 1/2012 | Sanders |
| 8,153,927 | B2 | 4/2012 | Twarog |
| 8,263,896 | B2 | 9/2012 | Schneider |
| 8,278,588 | B2 | 10/2012 | Salsich |
| 8,378,249 | B2 | 2/2013 | Salsich |
| 8,431,862 | B2 | 4/2013 | Kachline |
| 8,624,150 | B2 | 1/2014 | Simek |
| 8,680,434 | B2 | 3/2014 | Stöger |
| 8,686,318 | B2 | 4/2014 | Albrecht |
| 8,710,396 | B2 | 4/2014 | Salsich |
| 8,754,348 | B2 | 6/2014 | Salsich |
| 8,853,588 | B2 | 10/2014 | Mao |
| 8,981,253 | B2 | 3/2015 | Shipulski |
| 9,067,271 | B2 | 6/2015 | Kadlec |
| 9,144,882 | B2 | 9/2015 | Lindsay |
| 9,395,715 | B2 | 7/2016 | Brandt |
| 9,481,050 | B2 | 11/2016 | Brine |
| 9,560,732 | B2 | 1/2017 | Shipulski |
| 9,589,481 | B2 | 3/2017 | Becker |
| 9,636,768 | B2 | 5/2017 | Rozmarynowski |
| 9,642,236 | B2 | 5/2017 | Mather |
| 9,643,273 | B2 * | 5/2017 | Adams ................... B23K 9/013 |
| 9,662,747 | B2 | 5/2017 | Darrow |
| 9,672,460 | B2 | 6/2017 | Hoffa |
| 9,713,852 | B2 | 7/2017 | Becker et al. |
| 9,737,954 | B2 | 8/2017 | Hoffa |
| 9,782,852 | B2 | 10/2017 | Mao |
| 10,010,959 | B2 | 7/2018 | Daniel |
| 10,144,080 | B2 | 12/2018 | Chantry et al. |
| 10,272,575 | B2 * | 4/2019 | Pedersen ................ B25J 15/04 |
| 2005/0109738 | A1 | 5/2005 | Hewett |
| 2006/0049152 | A1 | 3/2006 | Mat |
| 2006/0163216 | A1 | 7/2006 | Brandt |
| 2008/0023449 | A1 | 1/2008 | Salsich |
| 2009/0008370 | A1 | 1/2009 | Salsich |
| 2009/0057286 | A1 | 3/2009 | Ihara |
| 2013/0112660 | A1 | 5/2013 | Enyedy |
| 2013/0119036 | A1 | 5/2013 | Daniel |
| 2013/0119037 | A1 | 5/2013 | Daniel |
| 2013/0263420 | A1 | 10/2013 | Shipulski |
| 2013/0264317 | A1 | 10/2013 | Hoffa |
| 2013/0264320 | A1 | 10/2013 | Shipulski |
| 2014/0021172 | A1 | 1/2014 | Sanders |
| 2014/0021175 | A1 | 1/2014 | Chen |
| 2014/0061170 | A1 * | 3/2014 | Lindsay ................. B23K 26/60 219/121.54 |
| 2014/0069895 | A1 | 3/2014 | Brine |
| 2014/0190944 | A1 | 7/2014 | Salsich |
| 2015/0154884 | A1 | 6/2015 | Salsich |
| 2015/0158109 | A1 | 6/2015 | Chantry |
| 2015/0181686 | A1 | 6/2015 | Schulze |
| 2015/0269603 | A1 | 9/2015 | Young, Jr. |
| 2015/0283640 | A1 | 10/2015 | Walker |
| 2015/0319835 | A1 | 11/2015 | Sanders |
| 2015/0319836 | A1 | 11/2015 | Sanders |
| 2015/0328710 | A1 | 11/2015 | Kachline |
| 2015/0332071 | A1 | 11/2015 | Hoffa |
| 2016/0050740 | A1 | 2/2016 | Zhang |
| 2016/0136764 | A1 | 5/2016 | Enyedy |
| 2016/0165711 | A1 | 6/2016 | Zhang |
| 2016/0165712 | A1 | 6/2016 | Zhang |
| 2016/0228972 | A1 | 8/2016 | Jogdand |
| 2016/0375524 | A1 | 12/2016 | Hsu |
| 2017/0001255 | A1 | 1/2017 | Winn |
| 2017/0042011 | A1 | 2/2017 | Sanders |
| 2017/0042012 | A1 | 2/2017 | Sanders |
| 2017/0042013 | A1 | 2/2017 | Sanders |
| 2017/0042014 | A1 | 2/2017 | Sanders |
| 2017/0042016 | A1 | 2/2017 | Mitra |
| 2017/0057003 | A1 | 3/2017 | Giezewski |
| 2017/0095879 | A1 | 4/2017 | Mitra |
| 2017/0124360 | A1 | 5/2017 | Young, Jr. |
| 2017/0165776 | A1 | 6/2017 | Becker |
| 2017/0181261 | A1 | 6/2017 | Roberts |
| 2017/0280547 | A1 | 9/2017 | Mitra |
| 2017/0282274 | A1 | 10/2017 | Knoener |
| 2017/0282281 | A1 | 10/2017 | Fochesatto |
| 2017/0291244 | A1 | 10/2017 | Peters |
| 2017/0295635 | A1 | 10/2017 | Peters |
| 2017/0295636 | A1 | 10/2017 | Mitra |
| 2017/0295637 | A1 | 10/2017 | Peters |

FOREIGN PATENT DOCUMENTS

| | | | |
|---|---|---|---|
| EP | 3189923 | A1 | 7/2017 |
| WO | 0044523 | A1 | 8/2000 |

OTHER PUBLICATIONS

Storm, Darlene, "Keurig 2.0 spoofing vulnerability: Hack bypasses coffee DRM, allows brewing of any pod" Computerworld, Dec. 10, 2014, accessible at https://www.computerworld.com/article/2857708/keurig-2-0-spoofing-vulnerability-hack-bypasses-coffee-drm-allows-brewing-of-any-pod.html, 5 pages.

Extended European Search Report in corresponding EP Application No. 191667583, dated Aug. 2, 2019, 8 pages.

* cited by examiner

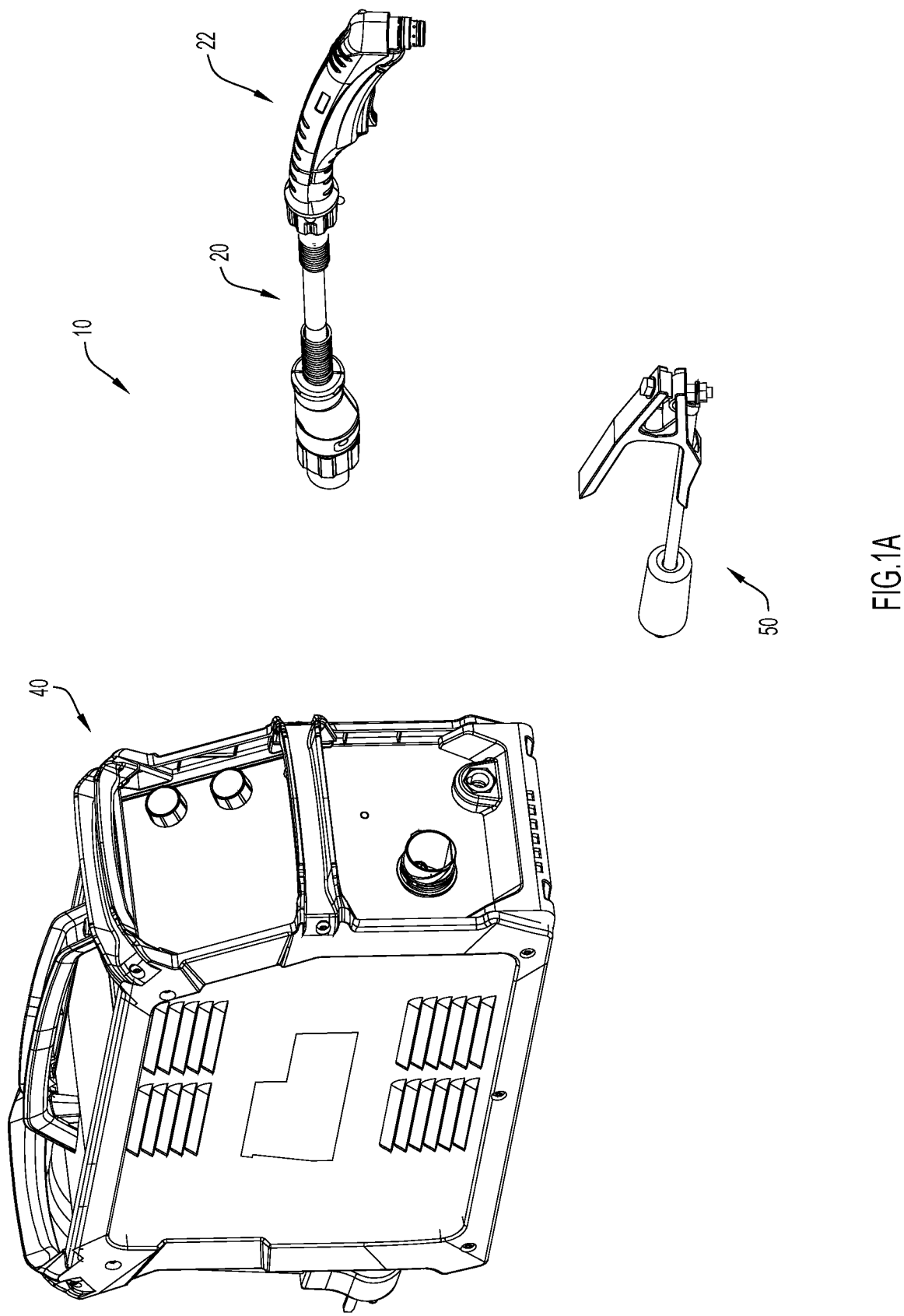

AUTOMATIC IDENTIFICATION OF COMPONENTS FOR WELDING AND CUTTING TORCHES

TECHNICAL FIELD

The present disclosure is directed toward identifying components for welding and cutting torches and, in particular, to automatically identifying interchangeable torch components, such as consumable components, for welding and/or cutting torches.

BACKGROUND

Many welding and cutting torches, such as plasma cutting torches, now include torch bodies that can receive a variety of consumables (e.g., welding tips, cutting tips, and/or a variety of electrodes), as well as other interchangeable torch components. Consequently, a single torch body may be able to be used for a variety of cutting and/or welding operations (with different tips, electrodes, and/or other interchangeable/consumable components being installed for different operations). Unfortunately, different interchangeable torch components (e.g., different torch tips and different electrodes) often require different operational settings. Thus, different interchangeable torch components (e.g., torch tips and/or electrodes) must be identified before or during installation onto the torch body (or at least prior to a torch operating). Additionally, a power supply connected to the torch body usually needs to be adjusted when the torch is used with different components.

Often, different consumable torch components (e.g., torch tips, electrodes, etc.) are identified by an operator prior to installing a particular torch component on/in a torch body. For example, an operator may scan a bar code included on a component or on packaging for the component. Unfortunately, visual identification is often difficult (if not impossible), especially for inexperienced users, and bar code identification is only possible when the end user is carrying a bar code reader. It may also be difficult to identify counterfeit or otherwise unsuitable consumable components (e.g., competitor components with characteristics that are not suited to provide optimal welding/cutting parameters with a particular torch body, for example, because the parts include altered geometries) with visual or bar code identification.

Alternatively, some components may be identified using radio-frequency identification (RFID) techniques, pressure decay measurement techniques, and/or surface reflectivity measuring techniques. Unfortunately, RFID identification techniques may be expensive and may be incompatible with older parts unless the older parts are retrofitted with a RFID tag (rendering the technique even more expensive). Meanwhile, identifying components by measuring pressure decay or reflectivity may be unreliable and/or impractical for quickly identifying interchangeable torch components (i.e., torch tips and/or electrodes) as they are installed in a torch body. For example, pressure decay measurements may only be able to identify a component after a substantial amount of time and, moreover, measuring pressure decay for a consumable may be inaccurate if the consumable is worn. Meanwhile, measuring the reflectivity of a component may be unreliable since reflectively measurements may be inconsistent, especially for components of different shapes.

Regardless of how interchangeable torch components are identified, the power supply usually needs to be manually adjusted to appropriate settings before a torch with a newly installed component can be safely used. In some instances, a user must consult industry literature (i.e., manuals) or the component's packaging to determine the appropriate settings, which may become quite tedious or confusing, especially for an inexperienced user. If, instead, a user adjusts the settings based on memory or does not adjust the settings while switching between consumable components, the torch may become unsafe to operate. Additionally or alternatively, the torch may operate under non-ideal conditions, which may negatively impact cutting/welding performance of the torch and/or decrease part life, each of which may create inefficiencies in welding/cutting operations, in terms of both time and cost.

In view of the foregoing, it is desirable to quickly and automatically identify a torch component installed on a torch (i.e., an electrode, torch tip, shield cup, gas distributor, or any other interchangeable/consumable part) with accuracy and reliability. Moreover, it is desirable to automatically adjust cutting or welding parameters, such as power parameters, flow parameters and/or fault conditions, based on the automatic identification.

SUMMARY

The present disclosure is directed towards automatically identifying components, such as consumable components, for welding and cutting torches. According to one embodiment, a torch assembly for welding or cutting operations includes a torch body and one or more imaging devices. The torch body has an operative end configured to removably receive one or more interchangeable torch components including one or more markings and defines an internal cavity. The one or more imaging devices are disposed within the internal cavity and are positioned to optically acquire an image or image data representative of the one or more markings included on the one or more interchangeable torch components so that the one or more interchangeable torch components can be automatically identified based on the one or more markings. Consequently, various components can be reliably and consistently identified with the techniques presented herein.

Moreover, the one or more markings (e.g., indicium or indicia) can be created with relatively inexpensive techniques, especially as compared to various other parts identification solutions, such as RFID tags; thus, older parts can be easily and inexpensively retrofitted to be suitable with the identification techniques presented herein. Still further, since the one or more markings can be or include a trademark, counterfeit or unsuitable parts can be easily identified (since counterfeit parts would not or, at least should not, include the trademark). This reduces safety risks and performance degradation associated with counterfeit and/or unsuitable parts. In at least some embodiments, the one or more markings are passive, mechanical markings.

In some embodiments, operational parameters of a torch including the component (e.g., power parameters of power supplied to the torch), are automatically adjusted in response to the automatic identifying. For example, the power supply may automatically adjust the current level supplied to the torch. Additionally or alternatively, the power supply may automatically adjust gas flow settings. Still further, an indication of operational parameters (e.g., current regulation) or a warning of unsafe conditions may be created at the power supply. Among other advantages, automatically adjusting operational parameters of the torch based on the automatic identifying allows a user to seamlessly transition from one cutting or welding operation to another cutting or welding operation.

For example, a user may seamlessly transition from cutting at 40 Amps with a first plasma cutting tip to cutting at 80 Amps with a second plasma cutting tip simply by swapping out various consumable components. As another example, a user may seamlessly transition from marking to cutting to gouging, etc., by swapping out consumable components. Moreover, and also advantageously, automatic adjustment of operational parameters may prevent a user from inadvertently or undesirably increasing or decreasing certain operational settings based on the consumable components currently installed in the torch. For example, the power supply may restrict the current of the supplied power to a specific upper limit based on an identity of a component or identities of components currently installed in/on the torch. Preventing a user from undesirably altering certain operational settings may discourage or prevent unsafe welding/cutting operations while also discouraging or preventing a user from cutting or welding with suboptimal operational settings. In turn, these adjustments/restrictions may decrease costs associated with a cutting/welding operation (i.e., by preventing errors and/or shortening the duration of operations) and decrease costs associated with cutting/welding operations over time, such as maintenance or replacement part costs (i.e., by extending the life of the torch, power supply, and/or torch components).

Still further, if an operator has obtained counterfeit or otherwise unsuitable consumable components (e.g., components with characteristics that are not suited to provide optimal welding/cutting parameters with a particular torch body), the techniques presented herein may either prevent the operator from initiating operations with the torch (i.e., prevent arc transfer) or apply limits to the operational parameters of the torch. Limiting the operational parameters of the torch may protect the operator and/or the torch from dangers that might potentially be caused by failure of a counterfeit or unsuitable consumable component.

According to another embodiment, a system includes a torch assembly and a power supply. The torch includes a torch body with an operative end that receives an interchangeable torch component with one or more passive, mechanical markings, and an imaging device that is disposed on or within the torch body and optically acquires an image or image data representative of the one or more passive, mechanical markings included on the interchangeable torch component. The power supply automatically adjusts operational parameters of the torch based on the one or more passive, mechanical markings.

According to yet another embodiment, automatic identification of components is effectuated by a method that includes visually or optically acquiring an image of or image data representative (e.g., capturing images) of one or more passive markings included on or in one or more interchangeable torch components installed on or in a torch or torch assembly by operating one or more imaging devices disposed in or on the torch body. The one or more interchangeable torch components are identified based on the one or more passive markings.

BRIEF DESCRIPTION OF THE SEVERAL VIEWS OF THE DRAWINGS

FIG. 1A is a perspective view of a cutting system including a power source and torch assembly configured to automatically identify interchangeable torch components and automatically adjust operational settings of the torch assembly, according to an example embodiment of the present disclosure.

Like numerals identify like components throughout the figures.

DETAILED DESCRIPTION

Figure 1B:
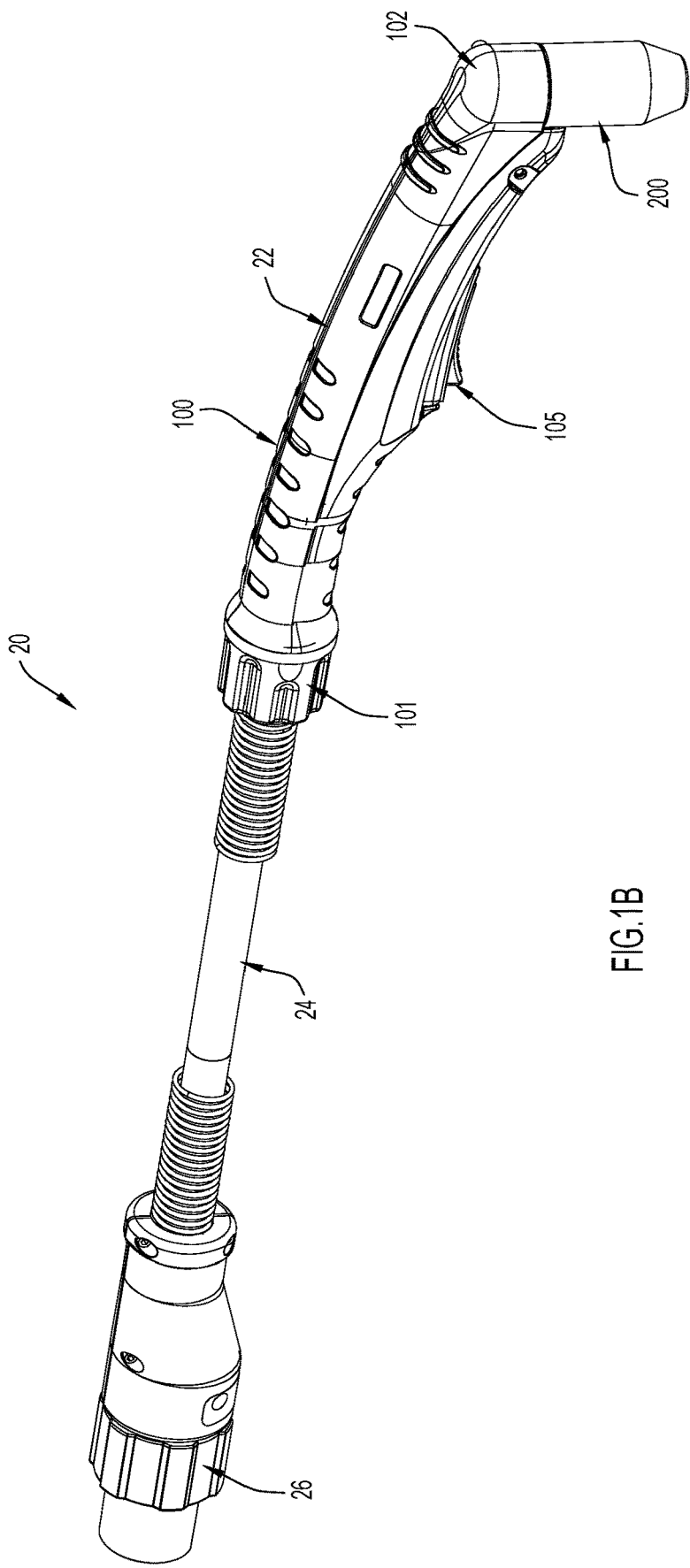
FIG. 1B is a perspective of the torch assembly of FIG. 1A, according to an example embodiment of the present disclosure.

A method, apparatus, and system for automatically identifying interchangeable torch components, such as electrodes, torch tips and other consumables, for welding and/or cutting torch assemblies (referred to herein simply as torch assemblies) are presented herein. The method, apparatus, and system identify interchangeable torch components with optical recognition techniques that identify one or more markings (e.g., one or more passive, mechanical markings) included on interchangeable torch components. For example, an imaging device, such as a camera, may be included in or on the torch assembly and the imaging device may be positioned to optically acquire an image of and/or image data representative a surface (e.g., a back surface) of one or more consumable components or an assembly of components (e.g. an serviceable and/or nonserviceable cartridge comprised of said components) installed onto/into the torch of the torch assembly. As two specific examples, a camera may acquire (e.g., capture) an image of a marking or a laser scanner may acquire image data representative of a marking.

Regardless of how images and/or image data are acquired, optical recognition techniques (e.g., optical character recognition (OCR) techniques) may be applied to the acquired image and/or image data to recognize one or more markings included in the image and/or image data. In some embodiments, the one or more markings included on the interchangeable torch components may include a manufacturer's trademark (e.g., ESAB) which allows the components to be recognized as a genuine component (i.e., not counterfeit). Additionally or alternatively, the one or more markings may include an indication of the operation(s) for which the component is intended (e.g., "60A CUT").

As is explained in further detail below, in at least some embodiments, a power supply coupled to a torch receiving interchangeable torch components may automatically adjust or control operational parameters of the torch when one or more of the interchangeable torch components included/installed in the torch are identified. For example, in some embodiments, the torch may be configured to emit light towards a surface of a torch component including one or more markings, optically acquire an image of and/or image data representative of the one or more markings, and transmit the image to a power supply. The power supply may then identify the component and automatically adjust power and gas transfer settings accordingly. The delegation of operations in this specific example may make the techniques presented herein relatively easy to retrofit into existing torches. The delegation of operations may also, in some embodiments, reduce the amount of processing (and number of components) required in the torch which may make the torch easier to service, lighter (at least incrementally), and/or easier to operate. Moreover, identifying the component at the power supply may allow the power supply to quickly adjust the parameters of power and/or gas being delivered to the torch based on the components installed in the torch, which may ensure that the torch cannot operate with unsafe or undesirable power parameters (i.e., undesirable for welding/cutting performance and/or for the longevity of the torch and/or the identified interchangeable torch components). That all being said, in other embodiments, a torch may include any necessary components therein so that interchangeable torch components can be identified at the torch (and instructions can be sent to the power supply in view of the same), as is also explained in further detail below.

FIG. 1A illustrates an example embodiment of cutting system 10 that may implement the techniques presented herein. At a high-level, the cutting system 10 include a power supply 40 that is configured to supply (or at least control the supply of) power and gas to a torch assembly 20 that includes a torch 22. As is described in further detail below, the power supply 40 supplies gas and/or power to the torch assembly 20 based on an identity of interchangeable components installed in the torch assembly 20. The cutting system 10 also includes a working lead 50 with a grounding clamp. Although lead 50 and the lead 32 included in the torch assembly 20 (see FIG. 1B) are illustrated as being relatively short, the leads may be any length. Although not shown, a welding system configured to implement the techniques presented herein may include similar components.

FIG. 1B illustrates the torch assembly 20 shown in FIG. 1A from an external perspective. As can be seen, the torch assembly 20 includes a torch 22 with a torch body 100 that extends from a first end 101 (e.g., a connection end 101) to a second end 102 (e.g., an operating or operative end 102). The connection end 101 of the torch body 100 may be coupled (in any manner now known or developed hereafter) to one end of lead 24 and the other end of lead 24 may be coupled to or include a connector 26 that allows the torch assembly 20 to be coupled to the power source 40 in any manner now known or developed hereafter (e.g., a releasable connection). Meanwhile, the operative end 102 of the torch body may receive interchangeable components, such as consumable components, which are generally denoted by item 200, but may include a variety of components, such as torch tips, electrodes, gas rings, etc., as is discussed in further detail below. The body 100 may also include a trigger 105 that allows a user to initiate cutting operations.

Figure 1C:
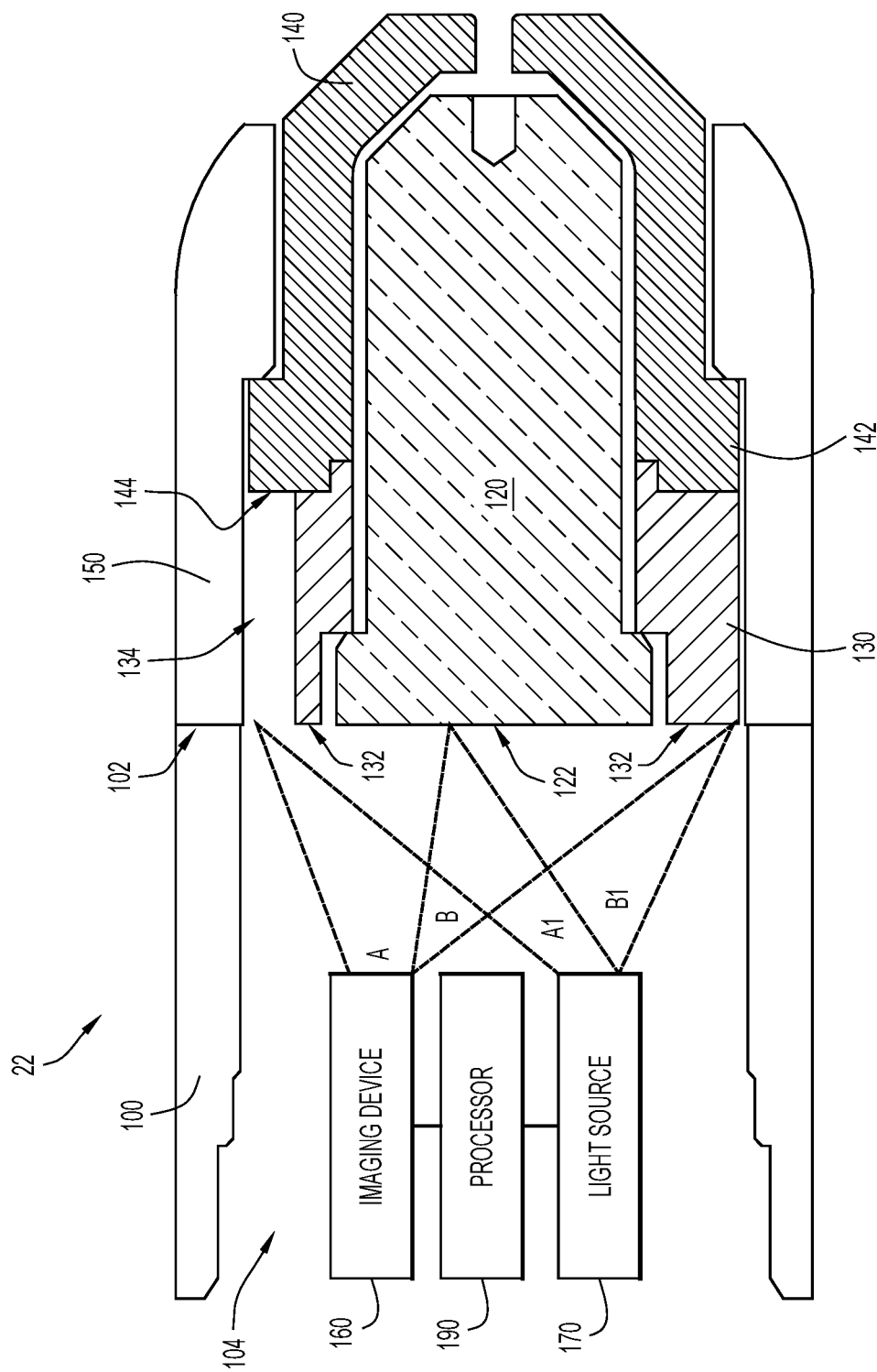
FIG. 1C is a sectional view of an end of the torch assembly of FIG. 1B that is configured to receive and automatically identify interchangeable torch components, according to an example embodiment of the present disclosure.

FIG. 1C illustrates a portion of torch 22 that is proximate the operative end 102 of the torch body 100. For simplicity, FIG. 1C illustrates the torch body 100 without various components or parts, such as power or gas transfer components, that are typically included in a welding/cutting torch. Instead, FIG. 1C illustrates only select components or parts that allow for a clear and concise illustration of the techniques presented herein. However, it is to be understood that any unillustrated components that are typically included in a torch (i.e., components to facilitate welding or cutting operations) may (and, in fact, should) be included in a torch configured in accordance with an example embodiment of the present invention.

In the depicted embodiment, the torch body 100 receives an interchangeable electrode 120, an interchangeable gas distributor 130, an interchangeable torch tip 140, and an interchangeable shield cup 150, insofar as each of these components may be interchangeable for other like components and is not necessarily interchangeable or reconfigurable in and of itself. For example, the electrode 120 is interchangeable because it may be swapped for or replaced with another electrode (or another, similar consumable). In the depicted embodiment, the gas distributor 130 and the electrode 120 can be installed onto the torch body 100 and the tip 140 can be installed there over. Alternatively, the electrode 120, the gas distributor 130, and the tip 140 can be installed onto the torch body 100 as a single component (e.g., as a cartridge). Either way, once the electrode 120, the gas distributor 130, and the tip 140 are installed onto/into the torch body 100, the shield cup 150 is installed around an installation flange 142 of the torch tip 140 in order to secure the electrode 120, the gas distributor 130, and the torch tip 140 in place at (and in axial alignment with) an operative end 102 of the torch body 100.

However, in other embodiments, the electrode 120, gas distributor 130, and/or torch tip 140 (as well as any other interchangeable torch components) can be secured or affixed to the torch body 100 in any desirable manner, such as by mating threaded sections included on the torch body 100 with corresponding threads included on the components. Moreover, in other embodiments, the torch assembly 20 (or just the torch 22) may include any suitable combination of interchangeable torch components, in addition to or in lieu of the interchangeable electrode 120, the interchangeable gas distributor 130, the interchangeable torch tip 140, and/or the interchangeable shield cup 150.

Still referring to FIG. 1C, the torch assembly 20 also includes an imaging device 160 that, in the depicted embodiment, is disposed within the torch body 100. More specifically, the torch body 100 defines an interior cavity 104 and the imaging device 160 is positioned within the interior cavity 104 so that the imaging device 160 can optically acquire one or more images of and/or image data representative of the operative end 102 of the torch body 100. That is, the imaging device 160 is positioned to optically acquire one or more images of and/or image data representative of interchangeable torch components installed on the operative end 102 of the torch body 100. In some embodiments, the imaging device 160 need not have a direct line of sight to the operative end 102 and, instead, may view the operative end 102 of the internal cavity 104 via any optics components, such as mirrors, fiber optics, light pipes, etc. now known or developed hereafter. Put another way, the imaging device 160 may be optically coupled to the operative end 102 of the internal cavity 104 via any optics components now known or developed hereafter. In fact, in some embodiments, the imaging device 160 need not be disposed within the torch assembly 20 and can be disposed on or near an outer surface of the torch body 100 and optically coupled to the operative end 102 of the interior cavity 104. That being said, embodiments with an internal imaging device 160 (i.e., an imaging device 160 disposed within interior cavity 104) may be sleeker, more efficient, and less likely to malfunction than embodiments including an imaging device coupled to an exterior surface of the torch body 100 or otherwise disposed externally of the torch assembly 20 (e.g., an "external imaging device 160").

Generally, the imaging device 160 may be any device or component capable of optically acquiring two-dimensional and/or three-dimensional images and/or image data representative of an image. For example, the imaging device 160 may be a single camera that captures two-dimensional images of any surfaces (and one or more markings included thereon) in its field of view. Additionally or alternatively, the imaging device 160 may include multiple imaging components, such as an array of cameras, multiple cameras, lasers, LIDAR, ultrasound, sonar, radar, infrared imaging device, etc., that allow the imaging device 160 to acquire two-dimensional images, three-dimensional images (e.g., to detect etchings, as is described in further detail below), and/or image data (e.g., data from an optical scan with a laser that is representative of an image).

As is illustrated in FIG. 1C, in some embodiments the imaging device 160 may have a field of view "A" that spans only a portion (e.g., half) of the operative end 102 of the torch body 100, but, in other embodiments, the imaging device 160 may have a field of view that spans the entire torch body 100 ("A"+"B"). As is explained in further detail below, in some embodiments, the interchangeable torch components (e.g., consumable components) may be keyed to align any markings with a certain radial location of the torch body (e.g., a "top" of the torch body). In these embodiments, it may only be necessary for the imaging device 160 to have a field of view "A" that covers the radial location (e.g., only have a field of view that covers a segment of the cylindrically-shaped torch body 100).

Moreover, in some embodiments, the various components may include pathways, openings, or other such features (e.g., embedded fiber optics) to expand the field of view of an imaging device 160 beyond the components that are immediately adjacent to the imaging device 160. For example, in FIG. 1C the imaging device 160 has a direct line of sight to a back surface 122 of the electrode 120 and a back surface 132 of the gas distributor 130, but the imaging device 160 may not have a direct line of sight to a back surface 144 of the torch tip 140. Thus, the gas distributor 130 defines a pathway 134 (e.g., a fiber optics pathway) that provides the imaging device 160 with a line of sight to a specific portion of the back surface 144 of the torch tip. Consequently, in the depicted embodiment, the imaging device is positioned to optically acquire one or more images of and/or image data representative of the back surface 122 of the electrode 120, the back surface 132 of the gas distributor 130, and the back surface 144 of the torch tip 140, regardless of whether the imaging device 160 has a field of vision defined by "A" or defined by "A"+"B."

In some embodiments, the torch assembly 20 may also include a light source 170 configured to illuminate a field of view (e.g., "A" or "A"+"B") of the imaging device 160. That is, if the imaging device 160 has a field of view "A," the light source 170 may illuminate at least the field of view "A", as is illustrated by "A1," and if the imaging device 160 has a field of view "A+B," the light source 170 may illuminate at least the field of view "A+B", as is illustrated by "A1+B1." The light source 170 may be any device that can illuminate surfaces of interchangeable torch components in a particular field of view, such as a light-emitting diode (LED). Additionally or alternatively, light emitted during operations of the torch (i.e., light emitted by a plasma arc) may supplement or replace light from the light source 170 included in or on the torch body 100 and, thus, the welding/cutting operations may also be referred to as the light source 170. If the torch assembly 20 includes a light source 170, the light source may be positioned within the internal cavity 104 of the torch body 100 and may be optically coupled to the operable end of the internal cavity 104 via any optics components, such as mirrors, fiber optics, light pipes, etc. now known or developed hereafter.

Although FIG. 1C illustrates a single imaging device 160 and a single light source 170, in some embodiments, the torch 20 may include multiple imaging devices 160, each dedicated to a specific type of interchangeable torch component 200 (e.g., a first imaging device for electrodes, a second imaging device for torch tips, etc.). In other embodiments, a single imaging device 160 may be suitable for imaging one or more markings 210 (see FIG. 2) included on any components 200 installed onto the torch body 100. Embodiments including multiple imaging devices 160 may also include multiple light sources 170. The light sources 170 may each be dedicated to a single imaging device 160, a set of imaging devices 160, or some combination thereof Alternatively, a single light source 170 might provide light for any imaging devices 160 included in a torch 20.

Still referring to FIG. 1C, the torch assembly 20 also includes a processor 190. The processor 190 included in the torch body 100 may operate any combination of imaging devices 160 and light sources 170. Moreover, as is described in further detail below, the processor 190 may identify the components based on their one or more markings or transmit data to the power supply that allows the power supply to identify the components based on their one or more markings. Thus, regardless of how the interchangeable electrode 120, the interchangeable gas distributor 130, the interchangeable torch tip 140, and/or the interchangeable shield cup 150 are attached to the operative end 102 of the torch body 100, if any of these interchangeable torch components (as well as any other interchangeable torch component included in or on the torch body 100) includes one or more markings 210 (see FIG. 2), the component can be identified based on one or more images of and/or image data representative of the one or more markings 210 acquired by the imaging device 160 (with the acquisition of images and/or image data potentially facilitated by illumination from light source 170).

Figure 2:
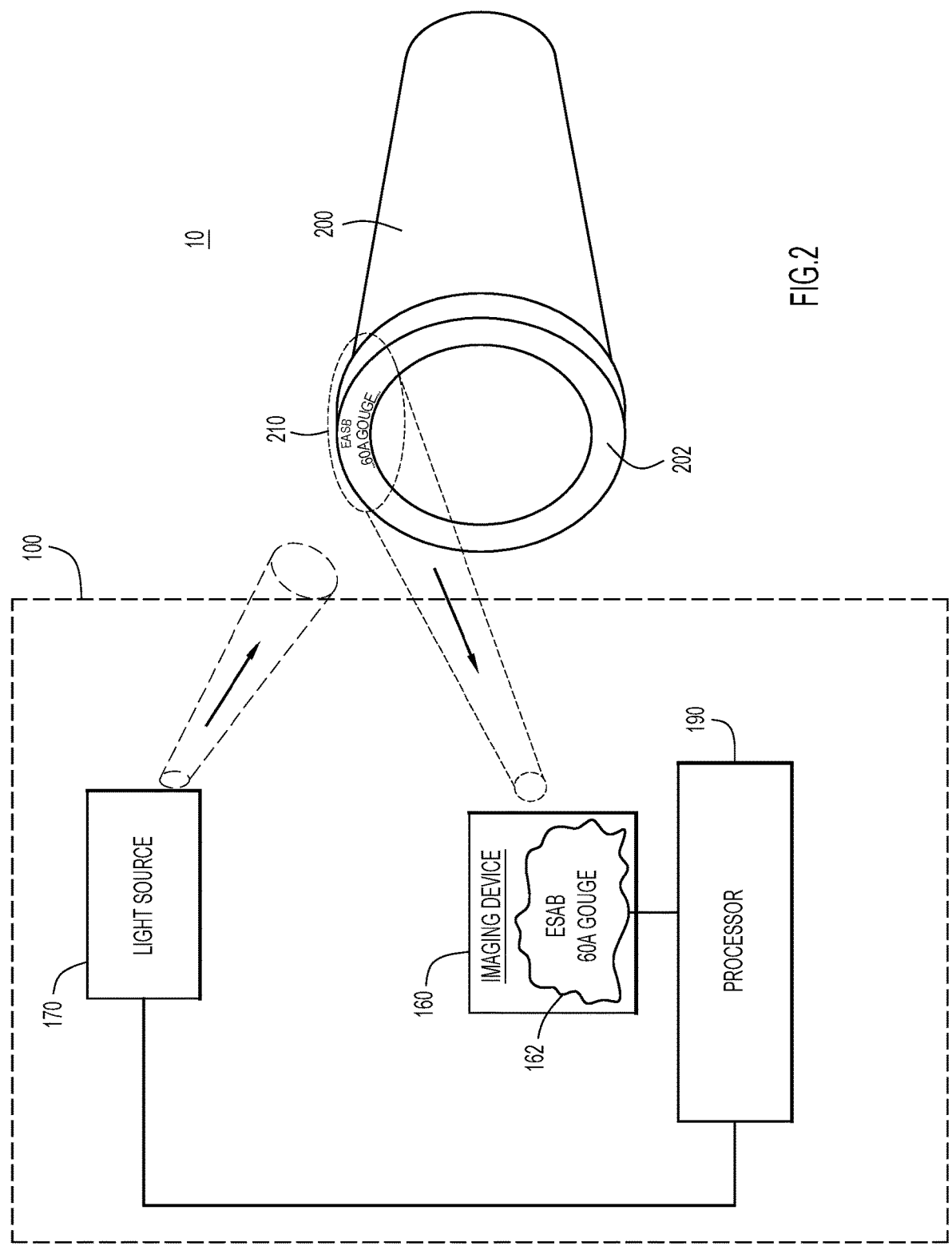
FIG. 2 is a block diagram representation of a portion of the torch illustrated in FIG. 1C and an interchangeable torch component, according to an example embodiment.

FIG. 2 provides a block diagram representation of the torch of FIG. 1C. Consequently, like parts from FIG. 1C are labeled with the same part numbers in FIG. 2 (and the description of these parts included above may be applicable to the like parts shown in FIG. 2). For example, the description of torch body 100 included above may be applicable to the torch body 100 depicted in FIG. 2 and, thus, the torch body 100 can receive an interchangeable consumable component 200 (which may be representative of electrode 120, gas distributor 130, torch tip 140, or shield cup 150) with one or more markings 210. For simplicity, the markings 210 may also be referred to herein as indicia 210, with the understanding that the term "indicia" may refer to one or more markings despite indicia being plural. In FIG. 2, the indicia 210 are included on a back surface 202 of the component 200; however, it is to be understood that this location is merely an example. In other embodiments, any interchangeable torch component 200 that is installable onto the torch body 100 (including interchangeable torch components shown in FIG. 1C as well as any other interchangeable torch components that are not shown in FIG. 1C, such as various consumables) may include indicia 210 on any location that is viewable by the imaging device 160 (either directly or via optics components).

Generally, an interchangeable torch component 200 can be manufactured with indicia 210 included thereon or the indicia 210 can be added to a surface of the component in any manner now known or developed hereafter. For example, indicia 210 may be permanently added to an interchangeable torch component (e.g., a consumable) by permanently marking the torch component with characters and/or symbols (e.g., with a laser, etching, printing, stamping, etc.). Alternatively, indicia may permanently or temporarily added to an interchangeable torch component (e.g., a consumable) with a label, sticker, or other such item/method. The characters and/or symbols of indicia 210 correspond to the component's manufacturer and application (e.g., purpose, usage, and characteristics). For example, in FIG. 2, interchangeable component 200 (represented as electrode 120, gas distributor 130, torch tip 140, or shield cup 150) includes indicia 210 that reads "ESAB 60A GOUGE." This indicates that the part was manufactured by ESAB (and, thus, may be suitable for an ESAB torch body) and is suitable for plasma gouging with 60 Amps. However, despite this example, the characters and/or symbols included in indicia 210 need not be human-readable (markings that are not human-readable may be referred to herein as machine-readable), provided that the imaging device 160 can optically acquire one or more images of and/or image data representative of the indicia 210 (even if the acquisition requires illumination from a light source 170) and that optical recognition techniques can be applied to the characters, symbols, or any other identifier/indicia.

The indicia 210 need not be two-dimensional and, instead, the indicia 210 may be or include three-dimensional features. For example, the indicia 210 may include a raised or carved portion. Three-dimensional features can be scanned for symbols and characters as well as profile and depth (e.g., with a laser, sonar, radar, etc.) and the profile and depth may be considered when the indicia are processed with optical recognition techniques. However, the indicia are passive, mechanical indicia, insofar as "passive" indicates that the indicia do not emit any signals, store or transmit any electronic data, or otherwise perform any actions. Put another way, the indicia/markings are dumb (as opposed to being smart indicia that might interact with a computing device). Meanwhile, "mechanical" indicates that the markings/indicia are physical markings formed or created from physical additive or subtractive processes applied to an interchangeable component. As some examples, the mechanical markings may include holes formed with drills, letters etched into a material, symbols printed onto a material, shapes etched onto a material, etc. In at least some embodiments, the markings are also non-functional insofar as the markings do provide an attachment point, a cooling feature, and/or some other functional aspect of an interchangeable component and, instead, are provided on the interchangeable component in addition to functional features.

Irrespective of the physical characteristics of the indicia (e.g., irrespective of whether the indicia are two-dimensional or three-dimensional, include holes or etched shapes, etc.), the indicia 210 (e.g., the one or more markings) are included on a portion of an interchangeable component 200 that will be within a field of view of the one or more imaging devices included in the torch assembly (e.g., field of view A from FIG. 1C). That is, the indicia 210 are provided in a location that is optically viewable from a position interior of the operative end 102 of the torch 22 (see FIG. 1C). For example, in at least some embodiments, the indicia 210 may be included at a radially exterior position on a rear surface (e.g., an end wall, as opposed to a side wall) of a consumable component. In at least some embodiments, this position is unobstructed (e.g., uncovered or not blocked by other components) and, thus, is optically viewable by the one or more imaging devices 160 included in the torch assembly.

By comparison, typically interchangeable components (e.g., consumable components) include branding information (or other such markings) on a larger surface (e.g., a side wall) of the component, where it is easier to include the branding information (e.g., since there is more surface area available to include the information). Additionally, typically, interchangeable components (e.g., consumable components) include mechanical mating features (e.g., threading, coolant passages/connections, etc.) at a rear end wall and, thus, it is difficult to include a marking on a rear end wall (or other such optically viewable portions of the component). Here, the one or more interchangeable components are marked on an optically viewable surface to ensure that one or more imaging devices included in the torch assembly can acquire an image and/or image data of the one or more markings included on the one or more interchangeable components. For example, in FIG. 1C, electrode 120 may include one or more markings on its rear surface 122, which may be an optically viewable surface, insofar as the surface may be viewable from the operative end 102 of the torch body 100 (of the torch 22).

Also irrespective of the physical characteristics of the indicia, in at least some embodiments, the component 200 includes features that align the indicia 210 with a specific portion of the torch body 100. In these embodiments, the alignment ensures that the indicia 210 are viewable by the imaging device 160 included in the torch body 100. For example, the component 200 and the torch body 100 may include markings (or any other type of mechanical keying) that indicate how to align the component 200 with the torch body 100 during installation of the component 200 onto the torch body 100 to ensure the indicia 210 will be optically aligned with the imaging device 160.

Moreover, although FIG. 2 illustrates only a single component 200 with indicia 210, one or more interchangeable torch components 200 may be installed onto a torch body 100 and the torch 20 may be configured to detect each of these components 200. In some embodiments, multiple components may be associated with a single marking or set of markings 210 (e.g., if multiple components are combined in a cartridge) and the one or more markings 210 may be specific to the combination of components. For example, multiple components could include a portion of an overall indicia pattern and the overall indicia pattern might be complete only when all of the components are connected to each other. As another example, a cartridge body might include one or more markings and might be configured to receive only specific consumable components (and the one or more markings might represent all of the components in the cartridge body). Alternatively, multiple components may each include their own indicia 210. In embodiments where various components include their own indicia 210, indicia 210 may be compared across components to determine cross-component compatibility. As mentioned, in some embodiments, the torch 20 may include multiple imaging devices, each dedicated to a specific type of interchangeable torch component 200 (e.g., a first imaging device for electrodes, a second imaging device for torch tips, etc.), but in other embodiments, a single imaging device 160 may be suitable for imaging indicia 210 included on any components 200 installed onto the torch body 100.

As was mentioned above (and is explained in detail below), the processor 190 may be configured to process an image 162 (or image data) acquired by the imaging device 160 (as opposed to simply being configured to operate one or more imaging devices 160 and one or more light sources 170). For example, in FIG. 2, the processor may apply OCR techniques to image 162 (which includes characters that provide "ESAB 60A GOUGE."). However, in various embodiments, any optical recognition techniques now known or developed hereafter may be applied to an image 162 acquired by the imaging device 160. Similarly, any optical techniques now known or developed hereafter may be applied to acquired image data in order to identify markings from data (e.g., to stitch together data from an optical scan and subsequently identify markings with optical recognition techniques). Generally, optical recognition techniques may involve comparing an acquired image and/or image data to a library of data and/or images to try to find a match.

Figure 3:
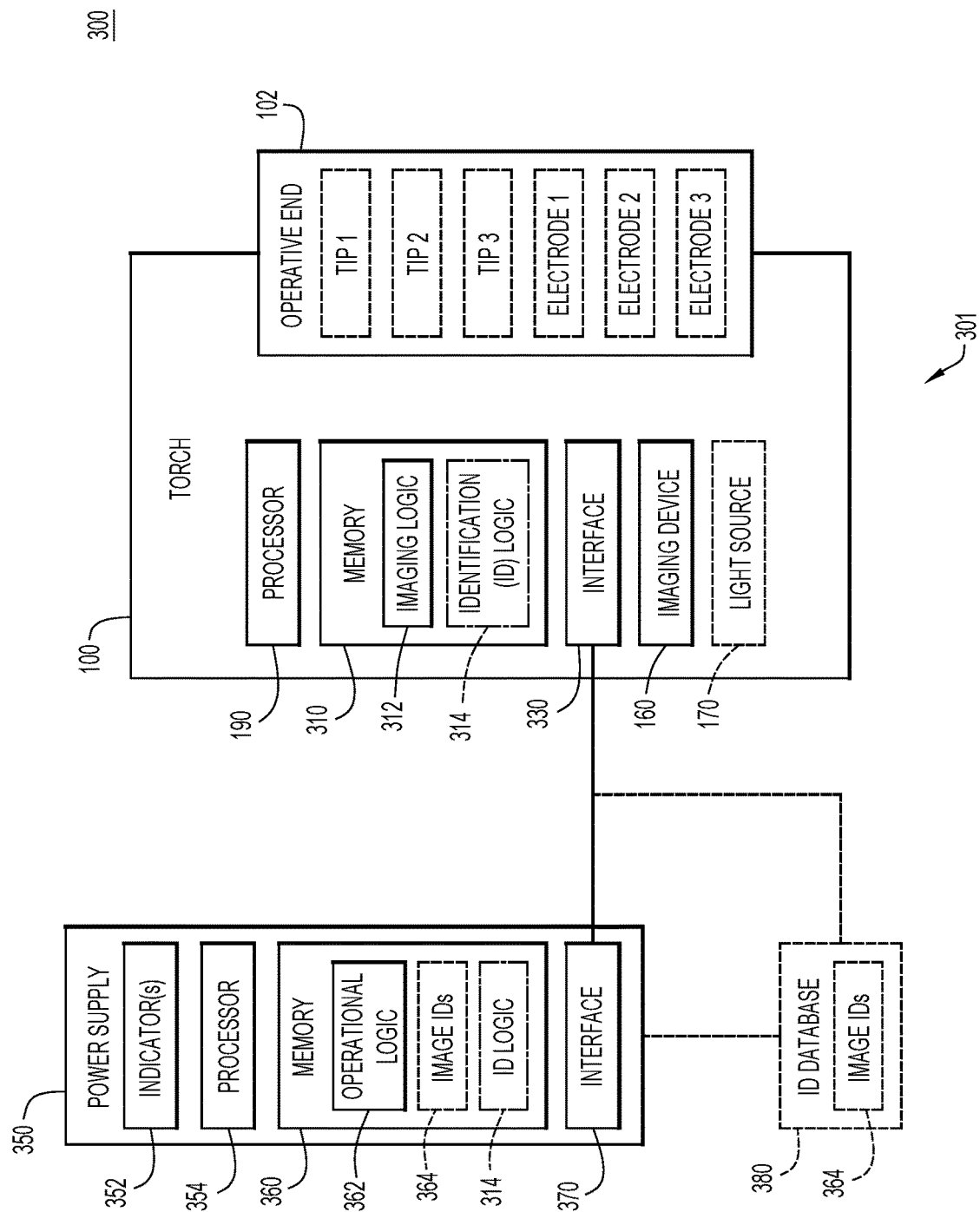
FIG. 3 is a block diagram of the torch assembly and the power supply of FIG. 1A, according to an example embodiment of the present disclosure.

Now turning to FIG. 3, this Figure depicts a high-level block diagram of a system 300 (e.g., cutting system 10) configured in accordance with the present invention. The system 300 includes a torch assembly 301 (such as the torch assembly 20 depicted in FIGS. 1A-C) and a power supply 350 (such as the power supply 40 depicted in FIG. 1A) that is configured to adjust operational parameters, such as power parameters or gas flow settings, of a welding or cutting operation. As was described above in connection with FIG. 1C, the torch assembly 301 may selectively receive interchangeable torch tips and electrodes, among other interchangeable torch components. Consequently, tips 1-3 and electrodes 1-3 are shown in dashed lines as possibly being installed on the operative end 102 of torch 30. As was also described above, the torch assembly 301 may also include a processor 190. Additionally, the torch assembly 301 may include a memory 310, and an interface 330 that provides a connection to an interface 370 included in the power supply 350. In some embodiments, the interface 330 included in the torch assembly 301 may provide a power and data connection to the power supply 350 (i.e., via separate transmission cables). For example, each interface 330 may include a wireless interface unit and a power interface unit, with the wireless interface unit enabling wireless data transfer between the torch assembly 301 and the power supply 350 and the power interface unit enabling wired power transfer from the power supply 350 to the torch 30.

Generally, the processor 190 (e.g., a microprocessor) may execute instructions included in memory 310 (i.e., imaging logic 312) in order to operate various components included therein or coupled thereto, such as one or more imaging devices 160 and one or more light sources 170. In some embodiments, the processor 190 may also execute imaging logic 312 to determine if required/necessary parts in place in/on the torch assembly 301, as is discussed in further detail below. Moreover, in some embodiments, the processor 190 may execute Identification (ID) logic 314 to identify a component installed therein (i.e., electrode 1-3 or tip 1-3), as was discussed briefly above. Still further, the processor 190 may execute instructions included in memory 310 (i.e., imaging logic 312) in order to send data and/or instructions to the power supply 350. The operations of the processor when executing the imaging logic are discussed in further detail below in connection with FIG. 4.

Meanwhile, the power supply 350 may also include a processor 354 configured to execute instructions stored in its memory 360 (i.e., operational logic 362 and ID logic 314). An image ID data structure 364 (i.e., a table) that correlates data received from the torch assembly 301 with component identities and/or one or more operating parameters may also be stored in the memory 360 of the power supply 350. Alternatively, the image ID data structure 364 can be stored in an external ID database 380 that may be accessed by the power supply 350 and/or torch assembly 301 (i.e., through a network interface unit included in interface 370 and/or interface 330, respectively). As is described in further detail below in connection with FIGS. 5 and 6, in at least some embodiments, the power supply processor 354 may execute the ID logic 314 to correlate data received from the torch assembly 301 with a component identity (from image IDs 364) to identify an installed component.

Additionally or alternatively, the power supply processor 354 may execute the operational logic 362 to adjust operational parameters of a welding or cutting operation while an identified component is disposed in the torch. In at least some embodiments, the operational parameters may include automated cutting/welding settings (e.g., settings controlled by a computer numerical control (CNC) controller), power/current settings, and/or gas flow settings. As some examples, the automated cutting/welding settings include travel speed, pierce height, standoff height/cut height, and/or pierce dwell time. By comparison, gas flow settings, in at least some embodiments, may include the type of gas being used (e.g., oxygen, nitrogen, argon, air, etc.) a pressure or flow rate, gas function (e.g., pre-flow and post-flow, cut gas, shield gas, etc.), and/or gas sequencing. In some embodiments, the power supply processor 354 may also execute operational logic 362 to determine if required/necessary parts in place in/on the torch assembly 301 (e.g., instead of processor 190 executing imaging logic 312 to make this determination), as is discussed in further detail below.

Still further, although not shown, in some embodiments, the interface 370 of the power supply 350 and/or the interface 330 of the torch assembly 301 may enable a connection (wired or wireless) to one or more external computing devices and the external computing device(s) may include ID logic 314 and/or operational logic 362 so that the external computing device can analyze an image or image data and communicate with the power supply 350 and/or torch assembly 301, adjust operational settings of the power supply 350, or otherwise execute logic associated with at least a portion of the techniques presented herein.

Generally, memory 310 and memory 360 included in the torch assembly 301 and power supply 350, respectively, may be configured to store data, including instructions related to operating various components or any other data. Moreover, memory 310 and memory 360 may include read only memory (ROM), random access memory (RAM), magnetic disk storage media devices, optical storage media devices, flash memory devices, electrical, optical or other physical/tangible (e.g., non-transitory) memory storage devices. Thus, in general, memory 310 and memory 360 may be or include one or more tangible (non-transitory) computer readable storage media (e.g., a memory device) encoded with software comprising computer executable instructions. For example, memory 310 and/or memory 360 may store instructions that may be executed by its associated processor (processor 190 and processor 354, respectively) for automatically identifying a component installed in/on a torch of torch assembly 301 and/or for automatically adjusting operational parameters in response to the automatically identifying, as described herein. In other words, memory 310 and/or memory 360 may include instructions, that when executed by one or more processors, cause the one or more processors to carry out the operations described herein.

Still referring to FIG. 3, the power supply may also include an indicator or indicators 352. In some instances, the indicator(s) 352 include a current gauge, pressure gauge, fault gauge, and/or other operational control signals. Additionally or alternatively, the indicator(s) 352 may include a display that can display the identity of currently identified components and/or display warnings when a user attempts to change power settings to unsafe settings.

Figure 4:
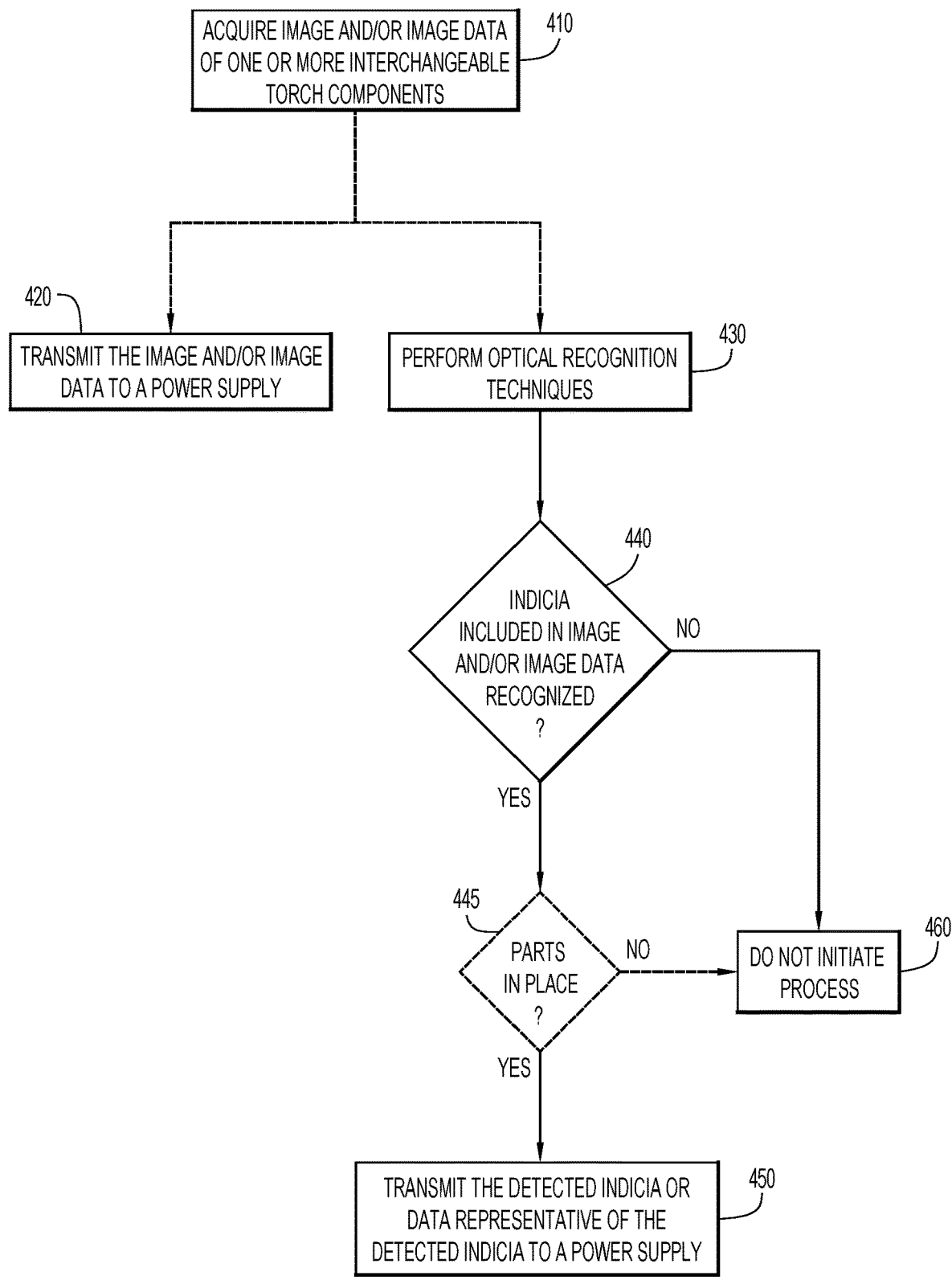
FIG. 4 is a high-level flow chart depicting operations of the torch illustrated in FIG. 1C or FIG. 3, according to an example embodiment of the present disclosure.

As mentioned, FIG. 4 illustrates a high-level flow chart of the operations performed by torch assembly 301 of FIG. 3 (which, again, may be representative of torch assembly 20 from FIGS. 1A-C), configured in accordance with an example embodiment. Initially, at 410, one or more imaging devices (e.g., imaging devices 160) optically acquire one or more images of and/or image data representative of one or more interchangeable torch components (e.g., consumable components) that are installed in/on the torch assembly 301 (i.e., consumable components included in a torch of torch assembly 301). In some embodiments, the one or more imaging devices constantly optically acquire one or more images of and/or image data representative of the operative end of the torch body and any interchangeable torch components installed therein. Alternatively, the one or more imaging devices may only optically acquire one or more images of and/or image data representative of the operative end of the torch body and any interchangeable torch components installed therein at predetermined intervals. The predetermined intervals may be time-based (e.g., every 30 seconds) or action-based. Exampled of predetermined, action-based intervals include intervals that start in response to: a powering-on of the power supply; a cycling of the power supply; a "fire" signal being received at a mechanized torch; an actuation of a trigger included on the torch; and/or a locking of interchangeable torch components into place on the torch body. In some embodiments, the light source included in the torch body may only illuminate the interchangeable torch components (and any indicia included thereon) at the predetermined intervals.

In some embodiments, the torch assembly transmits acquired images and/or image data to a power supply without analyzing the acquired images and/or image data at 420. For example, the torch assembly may forward acquired images and/or image data to the power supply as the images and/or image data are acquired and/or in batches or sets. Alternatively, at 430, a processor in the torch assembly (e.g., processor 190) may analyze the acquired images and/or image data with optical recognition techniques to identify one or more markings included on the one or more interchangeable torch components. For example, if the imaging device is constantly acquiring images and/or image data, the processor may detect changes in the acquired images and/or image data and then apply optical recognition techniques to images and/or image data when a change is detected (e.g., compare the one or more markings to a library of images). Alternatively, if the imaging device is acquiring images and/or image data at predetermined intervals, the processor may analyze each acquired image and/or image data with optical recognition techniques.

If the torch assembly applies optical recognition techniques to acquired images and/or image data at 430, the torch assembly may then determine, at 440, if one or more markings in the acquired images and/or image data are recognized. If the one or more markings are recognized at 440, the marking(s) or data representative of the marking(s) is transmitted to the power supply at 450. However, in some embodiments, prior to the transmitting at 450, the torch assembly may determine if the necessary parts for an operation are in place at 445 (this determination need not always occur and, thus, 445 is shown in dashed lines). For example, if a particular torch assembly requires an electrode, a gas distributor, a torch tip, and a shield cup to function properly for a particular plasma cutting operation, the torch assembly may determine that all of these components are currently installed on the torch assembly before initiating the operation.

If the torch assembly (or more specifically, the torch assembly's processor) determines that a necessary component is not installed (or is not properly installed), the torch assembly determines that parts are not in place at 445 and prevents the power supply from operating at 460 (i.e., by sending a signal to the power supply that prevents the power supply from supplying power). For example, if a shield cap is installed onto a torch before a torch tip is in place, the processor may determine that parts are not in place at 445 and prevent plasma cutting operations at 460. This determination may be made by counting a number of markings identified by the one or more imaging devices and comparing the number to a predetermined number (e.g., four markings may be required to determine that parts are in place), by identifying markings from each of any number of pre-determined required categories (e.g., parts are in place when markings from an electrode category, a gas distributor category, a torch tip category, and a shield cup category are identified). Additionally or alternatively, the parts in place determination may depend on whether markings are seen out of a particular focus range. For example, if markings are not in focus in an acquired image, the associated part might be determined to not be properly installed and, thus, the associated part may be considered to not be in place.

If the torch does not perform a parts in place analysis at 445, the marking(s) or data representative of the marking(s) is transmitted to the power supply at 450. As an example, if the markings "ESAB 60A GOUGE" are identified by an imaging device, the processor may, in some embodiments, simply transmit these markings to the power supply. Alternatively, the processor may determine operational settings based on the identified one or more markings and transmit instructions related to the operational settings to the power supply. For example, upon recognizing the markings "ESAB 60A GOUGE," the processor may instruct the power supply to supply power at 60 Amps and supply plasma gas at a pressure suitable for gouging, and set any other operational parameters necessary for gouging at 60 Amps. Transmitted instructions may be considered "data representative of the detected indicia." However, this is not the only data that is representative of the detected indicia. Other examples include digital data representative of the indicia (e.g., "valid" and "60A gouging") and analog data representative of the indicia (e.g., values assigned to valid and 60A gouging). As a more specific example, upon determining that indicia in acquired images and/or image data matches indicia stored in a library (e.g., image IDs 364), the torch assembly may transmit the image and/or image data and a "valid" determination to the power supply, which may handle the remainder of the operations associated with automatically configuring the torch assembly for the valid, identified components.

Regardless of what exactly is transmitted at 450, if the indicia are identified, the torch assembly may, at least eventually, proceed with the torch operation. If, on the other hand, at 440, the torch assembly's processor does not recognize the indicia at 410, the processor may prevent the torch assembly from operating at 460. That is, the torch assembly may be prevented from initiating a cutting- or welding-related process.

Still referring to FIG. 4, although the embodiments discussed herein have, for the most part, discussed torch assemblies with internal imaging devices, in some embodiments, the imaging device may actually be included in the power supply and the cabling between the torch assembly and power supply might include optical components to optically link the power supply with the operative end of the torch body. In these embodiments, the power supply may perform the operations depicted in FIG. 4. Alternatively, the torch assembly may gather information from the power supply (or another external imaging device, such as an imaging device disposed on a lead of the torch assembly that extends between the torch and the power supply) that is acquiring images and/or image data of the operative end of the torch (and any components installed therein).

Figure 5:
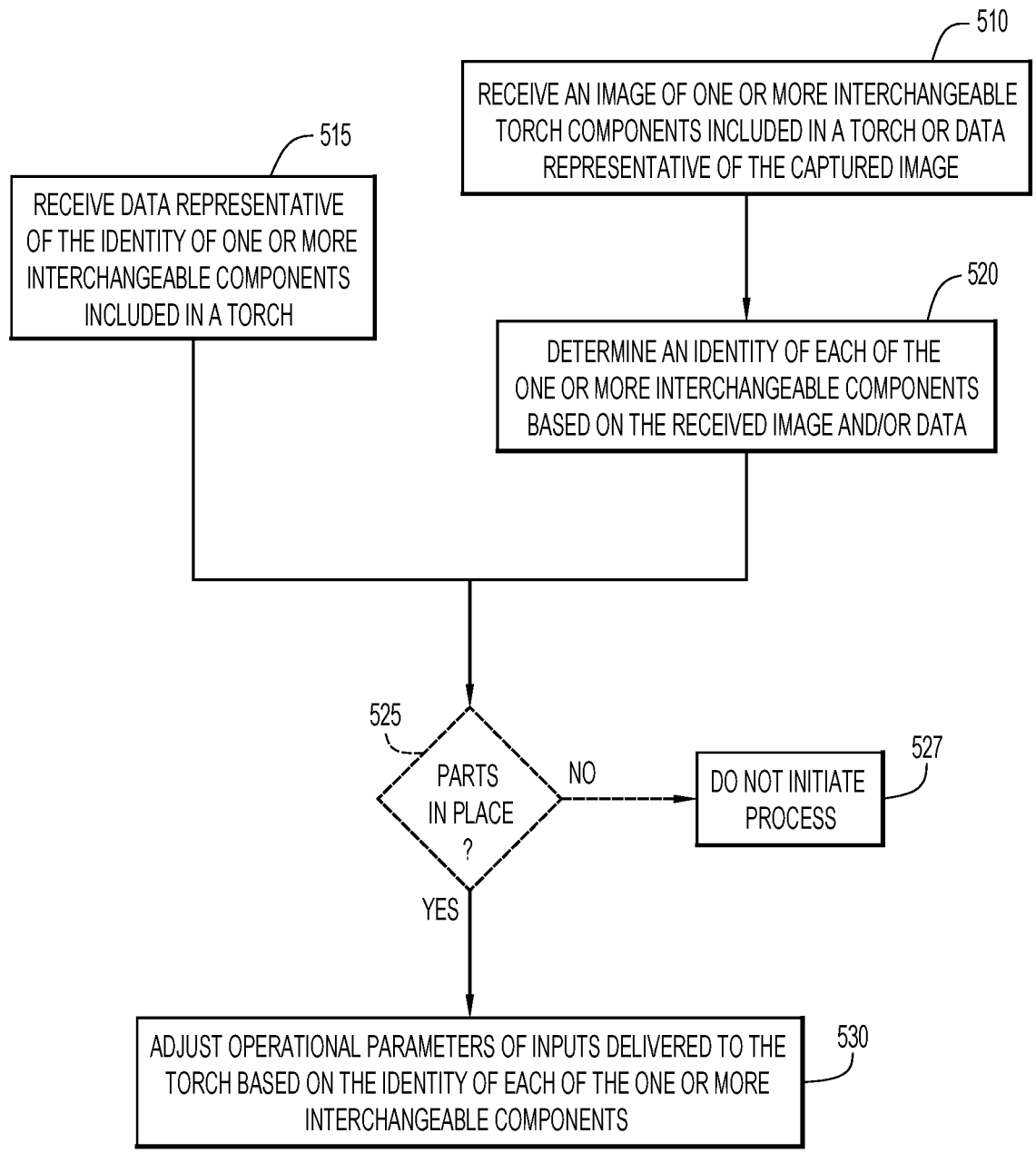
FIG. 5 is a high-level flow chart depicting operations of the power supply of FIG. 3, according to an example embodiment of the present disclosure.

FIG. 5 depicts a high-level flow chart of the operations of the power supply configured in accordance with an example embodiment. Initially, at 510 or 515, the power supply receives data from the torch assembly. More specifically, at 510, the power supply receives one or more images and/or image data of one or more interchangeable torch components included in a torch or data representative of the acquired images and/or image data. As mentioned above, data representative of the acquired images and/or image data may include digital data representative of the indicia (e.g., "valid" and "60A gouging"), analog data representative of the indicia, and instructions for adjusting the operational parameters. If the data is or includes instructions, the power supply may simply adjust the operational parameters provided to the torch assembly at 530 (and, thus, 520 is shown in dashed lines). However, if the data neither includes instructions nor identifies the interchangeable torch components (this data is received at 515), the power supply must determine the identity of the one or more interchangeable torch components with indicia in the acquired images and/or image data. For example, if the power supply receives the images and/or image data, the processor in the power supply may apply optical recognition techniques to the images and/or image data. As another example, if the power supply receives analog or digital data representative of indicia identified in an acquired images and/or image data, the power supply may query a lookup table with this data to identify one or more interchangeable torch components associated with the indicia represented by the received data. Notably, in embodiments that identify combinations of interchangeable torch components at the power supply, one or more imaging devices may send data to the power supply so that, at 510 (or 515), the power supply may be receiving data from multiple sources.

If at 515 or 520 the power supply does not receive an identity or is unable to determine an identity, respectively, the power supply may determine that an interchangeable torch component is incompatible with the particular torch assembly, be it a plasma cutting torch assembly, a welding torch assembly, or any other torch assembly (the plasma components mentioned herein are merely examples, and the techniques presented herein may identify any components for any torch assembly type). For example, if data received at 510 indicates that the component does not include indicia, the power supply may determine that the interchangeable torch component is incompatible with the torch assembly.

In some embodiments, the power supply may also determine whether parts are in place at 525 (however, in some embodiments, the power supply does not determine if parts in place and, thus, 525 is shown in dashed lines). The power supply makes this determination in accordance with the description of step 445 included above which, for brevity, is not repeated here. That is, in some embodiments, the power supply determines whether parts are in place and, thus, the description of 445 included above may be applicable to step 525. In some of these embodiments, the power supply determines if parts are in place in lieu of the torch assembly making this determination. Alternatively, the power supply and torch assembly may work together to determine if parts are in place. That is, the power supply and torch assembly may complete operations described above in connection with 445 in tandem or unison. In still other embodiments, the torch assembly may render a parts in place determination independently (and, the power supply can ignore this step). If the power supply analyzes indicia to determine whether parts are in place, the power supply may refrain from initiating a welding or cutting process, at 527, when parts are not in place. When parts are in place, the power supply may proceed to step 530.

At 530, the power supply adjusts the operational parameters of the torch assembly based on the identity determined at 520. For example, if an interchangeable torch component is identified as a 60 Amp or 40 Amp cutting tip for a plasma cutting torch assembly, the power supply may adjust the power delivery so that 60 Amps or 40 Amps of current are delivered to the torch assembly, respectively. Moreover, if the power supply detects that a user is attempting to change the current to 100 Amps when the power supply has determined that the 60 Amp or 40 Amp torch tip is installed on the torch body, the power supply may automatically roll the current back to a safe level (i.e., to 60 or 40 Amps). That is, in some instances, the techniques may not prevent arc initiation, but will ensure arc transfer is effectuated with optimal operational parameters (to ensure safety and high quality operations). Alternatively, if the torch tip is identified as a gouging tip, the power supply may be set to a gouging mode. Still further, if the torch tip is unidentified, the power supply may either prevent arc transfer to a work piece or limit the operational settings to very low levels to ensure that the unidentified component does not fail and damage other torch components or endanger the end user. This may prevent counterfeit or unsuitable/undesirable components from being used with or damaging the torch body.

Figure 6:
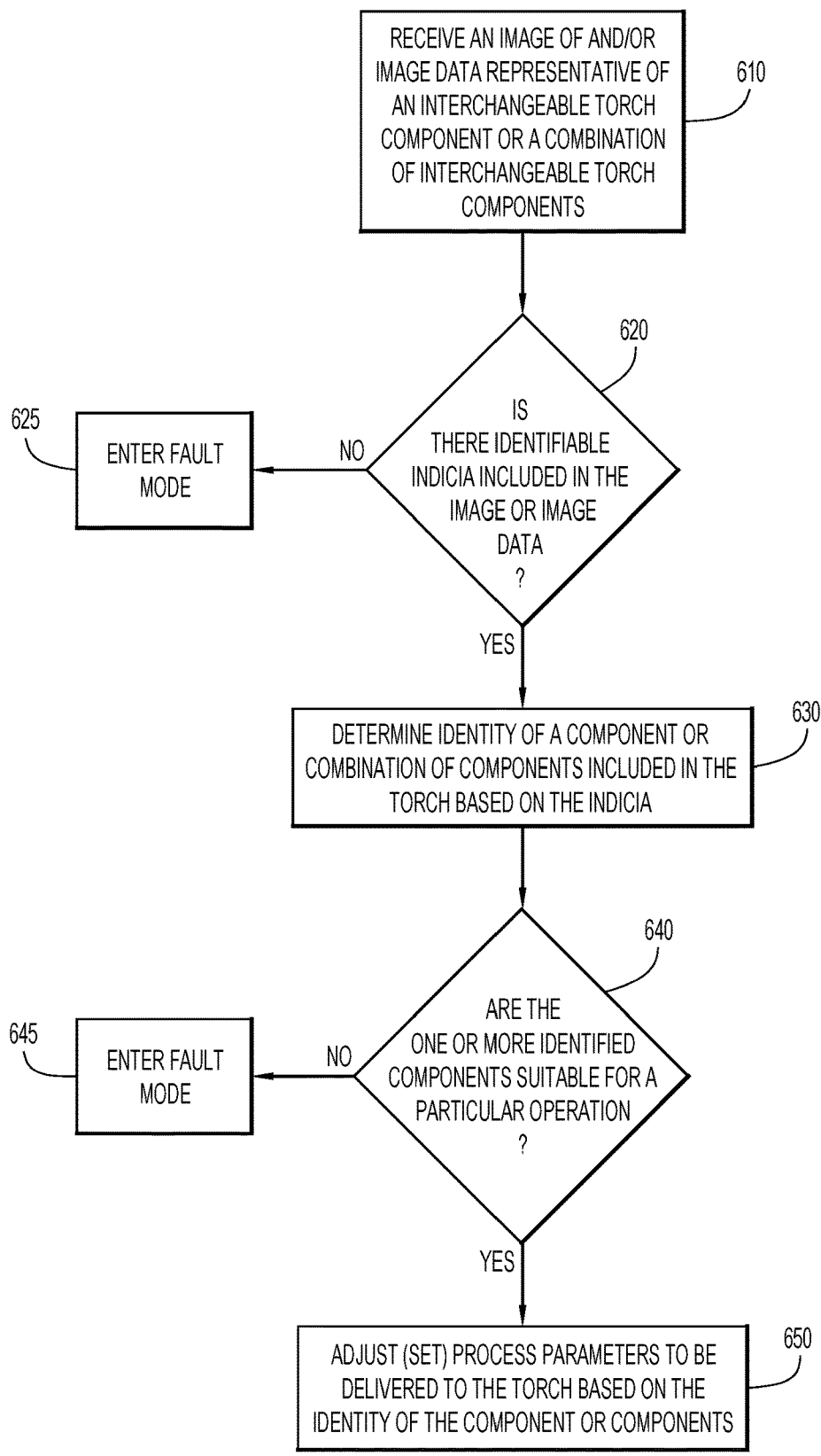
FIG. 6 is a high-level flow chart depicting operations of the power supply of FIG. 3, according to another example embodiment of the present disclosure.

Now turning to FIG. 6, this Figure depicts another high-level flow chart of the operations of the power supply configured in accordance with another example embodiment. In FIG. 6, the power supply initially receives acquired images and/or image data of an interchangeable torch component or a combination of interchangeable torch components from the torch assembly at 610. At 620, the power supply determines if the one or more interchangeable torch components included in the acquired images and/or image data include any identifiable indicia. This determination may determine if the parts are genuine (i.e., suitable for the torch assembly and not counterfeit). In some embodiments, the library of images used to identify indicia may include tags indicating whether indicia are genuine. Alternatively, the library of images may only include genuine indicia so that only genuine indicia are identified.

If identifiable indicia are found at 620 (and, thus, the parts are determined to be genuine at 620), the power supply may then determine identities for any identifiable interchangeable torch components currently installed in or on the torch assembly at 630. At 640, the power supply determines whether the identified interchangeable torch components are consistent or compatible for a particular cutting/welding operation. To make this determination, the power supply may determine if multiple identified interchangeable torch components can or should be used together and/or if one or more identified interchangeable torch components are suitable for a selected welding/cutting operations. For example, the power supply may determine if an electrode, a torch tip, a gas distributor, and a shield cup currently installed in/on a torch assembly are all suitable for a 100 Amp air/air cutting operation.

If, instead, at 620 the power supply determines that one or more parts are not genuine and/or unsuitable for the particular torch assembly (i.e., one or more parts are counterfeit), the power supply may enter a fault mode at 625. Similarly, if, at 640, the power supply determines that at least one of the identified interchangeable torch components is incompatible with other identified interchangeable torch components (i.e., one interchangeable torch component is not suitable for 100 Amp air/air cutting) the power supply may enter a fault mode at 645. When the power supply is operating in fault mode, it may prevent operations of the torch assembly. Alternatively, in fault mode, the power supply may limit operations of the torch to operations that will not experience a degradation in quality and/or become unsafe when operating with the identified interchangeable torch components. By comparison, if the power supply determines that the identified interchangeable torch components are compatible with each other and/or suitable for a particular cutting/welding operation, the power supply may automatically adjust, at 650, process parameters (i.e., operational parameters) to be delivered to the torch assembly based on the identity of the component or components. That is, the power supply (or the torch assembly) may determine that identified components are all intended to be used for a particular operation and the power supply may adjust operational parameters of the torch assembly to support the particular operation.

Among other advantages, the techniques described and shown herein allow a user to quickly and seamlessly transition between various cutting and welding operations. The techniques presented herein also provide increased safety and better operating conditions for welding and cutting operations by automatically configuring operational parameters (e.g., power and gas transfer parameters) for the specific components currently installed on/included in a torch assembly. Consequently, inexperienced and experienced users alike need not know (or even try to find) the particular settings for every component and need not even identify components as they install them. That is, the techniques presented herein eliminate the need for the end user to be knowledgeable about ideal settings and/or counterfeit parts. Moreover, even if a user tries to use an unsafe or suboptimal setting, the techniques presented herein may prevent the user from doing so (since the techniques presented herein ensure that ideal settings are applied for specific operations with genuine parts). This will result in improved and more consistent performance, greater ease of use, and improved safety.

As still further examples, the techniques presented herein may inexpensively and reliably identify components. That is, at least as compared to adding electrical components to a torch component, adding a marking to a component may be considerably cheaper and at least as reliable. Moreover, the techniques do not require an additional electrical connection between the power supply and the torch assembly (as compared to typical welding/cutting operations).

To summarize, in one form a torch assembly is presented herein, the torch assembly comprising: a torch body with an operative end configured to removably receive one or more interchangeable torch components including one or more markings, the torch body defining an internal cavity; and one or more imaging devices disposed within the internal cavity and positioned to optically acquire an image of or image data representative of the one or more markings included on the one or more interchangeable torch components so that the one or more interchangeable torch components can be automatically identified based on the one or more markings.

In another form, a system is presented herein, the system comprising: a torch assembly including: a torch body with an operative end that receives an interchangeable torch component with one or more passive, mechanical markings; and an imaging device that is disposed on or within the torch body a torch component that is removably coupleable to the torch body, the torch component including one or more passive, mechanical markings on a surface that is optically viewable by the imaging device when the torch component is removably coupled to the torch body so that the imaging device can optically acquire an image of or image data representative of the one or more passive, mechanical markings; and; and a power supply that automatically adjusts operational parameters based on the one or more passive, mechanical markings.

In yet another form, a method of identifying interchangeable torch components is presented herein, the method comprising: optically acquiring an image of or image data representative of one or more passive markings included on one or more interchangeable torch components installed on or in a torch body by operating one or more imaging devices disposed in or on the torch body; and identifying the one or more interchangeable torch components based on the one or more passive markings.

In still yet another form, a consumable component that is removably coupleable to a torch configured to automatically adjust operational parameters based on an identity of consumable components installed therein is presented herein, the consumable component comprising: a surface that is optically viewable at an operative end of the torch; and one or more passive, mechanical markings disposed on the surface, the one or more passive, mechanical markings providing information relating to at least one of: an identity of the consumable component; an operational parameter associated with the consumable component; and a presence of the consumable component in a requisite location within the torch.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

We claim:

1. A torch assembly for welding or cutting operations, comprising:
    a torch body with an operative end configured to removably receive one or more interchangeable torch components including one or more markings, the torch body defining an internal cavity; and
    one or more imaging devices disposed within the internal cavity and positioned to optically acquire an image of or image data representative of the one or more markings included on the one or more interchangeable torch components so that the one or more interchangeable torch components can be automatically identified based on the one or more markings.

2. The torch assembly of claim 1, further comprising:
one or more light sources configured to illuminate the one or more markings included on the one or more interchangeable torch components.

3. The torch assembly of claim 2, further comprising:
a memory; and
a processor that executes instructions stored in the memory so that the processor operates the one or more imaging devices and the one or more light sources.

4. The torch assembly of claim 3, wherein the processor further:
transmits the image or the image data to a power supply so that the one or more interchangeable torch components can be automatically identified based on the one or more markings.

5. The torch assembly of claim 3, wherein the processor operates the one or more imaging devices and the one or more light sources at predetermined intervals that are at least one of time-based intervals and action-based intervals.

6. The torch assembly of claim 1, wherein the one or more imaging devices comprise at least a single camera and the one or more markings are disposed on portions of the one or more interchangeable components that are optically viewable by the single camera.

7. The torch assembly of claim 1, further comprising:
a memory; and
a processor that executes instructions stored in the memory so that the processor:
operates the one or more imaging devices; and
analyzes the image or the image data with optical recognition techniques to automatically identify the one or more interchangeable torch components based on the one or more markings.

8. The torch assembly of claim 7, wherein the processor further:
transmits instructions to a power supply to adjust operational parameters for the torch based on an identity of the one or more interchangeable torch components determined by the automatic identifying.

9. The torch assembly of claim 1, wherein the one or more interchangeable torch components are consumable components and the one or more markings are included on optically viewable portions of the consumable components.

10. A system, comprising:
a torch assembly including:
a torch body with an operative end that receives an interchangeable torch component with one or more passive, mechanical markings;
an imaging device that is disposed within or on the torch body; and
a torch component that is removably coupleable to the torch body, the torch component including one or more passive, mechanical markings on a surface that is optically viewable by the imaging device when the torch component is removably coupled to the torch body so that the imaging device can optically acquire an image of or image data representative of the one or more passive, mechanical markings; and
a power supply that automatically adjusts operational parameters based on the one or more passive, mechanical markings.

11. The system of claim 10, wherein the torch assembly transmits the image or the image data to the power supply and the power supply identifies the one or more passive, mechanical markings with optical recognition techniques so that the power supply can automatically adjust the operational parameters.

12. The system of claim 11, wherein the power supply:
determines an identity of the torch component based on the one or more passive, mechanical markings; and
adjusts the operational parameters of power delivered to the torch based on the identity.

13. The system of claim 10, wherein the torch assembly further comprises:
a light source configured to illuminate the one or more passive, mechanical markings included on the torch component.

14. The system of claim 13, wherein the torch assembly further comprises:
a memory; and
a processor that executes instructions stored in the memory so that the processor operates the imaging device and the light source at predetermined intervals.

15. The system of claim 10, wherein the imaging device comprises at least a single camera.

16. The system of claim 10, wherein the one or more passive, mechanical markings are three-dimensional passive, mechanical markings and the imaging device is configured to detect at least one of a depth of the three-dimensional passive, mechanical markings and a profile of the three-dimensional passive, mechanical markings.

17. A method of identifying interchangeable torch components, comprising:
optically acquiring an image of or image data representative of one or more passive markings included on one or more interchangeable torch components installed on or in a torch body by operating one or more imaging devices disposed in or on the torch body; and
identifying the one or more interchangeable torch components based on the one or more passive markings.

18. The method of claim 17, wherein the image is a raw image or a processed image, and the method further comprises:
transmitting the image or the image data to a power supply so that the one or more interchangeable torch components can be automatically identified based on the one or more passive markings.

19. The method of claim 17, further comprising:
analyzing the image or image data with optical recognition techniques to automatically identify the one or more interchangeable torch components based on the one or more passive markings.

20. The method of claim 19, wherein the analyzing is performed by a processor included in the torch and the method further comprises:
transmitting instructions to a power supply to adjust operational parameters based on an identity of the one or more interchangeable torch components determined by the automatic identifying.

21. A consumable component that is removably coupleable to a torch configured to automatically adjust operational parameters based on an identity of consumable components installed therein, the consumable component comprising:
a surface that is optically viewable at an operative end of the torch; and
one or more passive, mechanical markings disposed on the surface, the one or more passive, mechanical markings providing information relating to at least one of:
an identity of the consumable component;
an operational parameter associated with the consumable component; and a presence of the consumable component in a requisite location within the torch.

22. The consumable component of claim 21, wherein the surface is a rear end wall of the consumable component.

23. The consumable component of claim 21, wherein the one or more passive, mechanical markings include a trademark identifying a manufacturer of the consumable component.

24. The consumable component of claim 21, wherein the one or more passive, mechanical markings comprise machine-readable markings.

25. The consumable component of claim 21, wherein the surface is viewable by an imaging device included in a torch assembly including the torch and the imaging device is configured to acquire an image of or image data representative of the one or more passive, mechanical markings included on the surface so that the operational parameter associated with the component can be determined.

* * * * *